United States Patent
Fukazawa

(10) Patent No.: US 6,774,809 B2
(45) Date of Patent: Aug. 10, 2004

(54) PERSONAL COMPUTER CARD SLOT AND INFORMATION PROCESSING DEVICE USING SAME

(75) Inventor: Yoshiaki Fukazawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/779,667

(22) Filed: Feb. 9, 2001

(65) Prior Publication Data

US 2001/0011952 A1 Aug. 9, 2001

(30) Foreign Application Priority Data

Feb. 9, 2000 (JP) ........................................ 2000-031558

(51) Int. Cl.[7] .............................................. G08B 21/00
(52) U.S. Cl. .................... 340/687; 340/635; 340/653; 340/710; 340/301; 340/302
(58) Field of Search ................................. 340/635, 653, 340/687; 710/102, 103, 101, 302, 303, 301

(56) References Cited

U.S. PATENT DOCUMENTS 5,734,860 A * 3/1998 Kondo ........................ 395/442
6,081,858 A * 6/2000 Abudayyeh et al. ........ 710/102

FOREIGN PATENT DOCUMENTS

| JP | 63-56472 | 4/1983 |
| JP | 5-25553  | 4/1993 |

OTHER PUBLICATIONS

Japanese Office Action dated Sep. 24, 2003 with English translation of pertinent portions.

Japanese Patent Office Action issued on Jun. 17, 2003; English translation of relevant parts.

* cited by examiner

*Primary Examiner*—Julie Lieu
(74) *Attorney, Agent, or Firm*—Whitham, Curtis & Christofferson, P.C.

(57) ABSTRACT

A PC card slot and an information processing device using the PC card slot are provided which are capable of having a user recognize a state of a PC card so that the user should not pull out the PC card carelessly or accidentally during access to the PC card or before completion of software termination procedures. The PC card slot is equipped with a PC card interface and a light emitting unit which goes on or off in response to a state of the PC card connected to the PC card interface.

8 Claims, 2 Drawing Sheets

PERSONAL COMPUTER CARD SLOT AND INFORMATION PROCESSING DEVICE USING SAME

BACKGROUND OF THE INVENTION

1. Field of the Invention

The present invention relates to a PC (Personal Computer) card slot and an information processing device using a PC card and more particularly to the PC card slot capable of preventing the PC card being pulled out carelessly or accidentally while the PC card is being accessed or power is being supplied to the PC card and the information processing device using the same.

The present application claims priority of Japanese Patent Application No. 2000-031558 filed on Feb. 9, 2000, which is hereby incorporated by reference.

2. Description of the Related Art

A conventional information processing device having a PC card interface such as a portable personal computer (hereafter referred to as a notebook personal computer) is not provided with a hardware-based mechanism that can inform a user that a PC card is being accessed.

Therefore, there are the following problems with conventional technology:

1. A user pulls out the PC card carelessly or accidentally from a PC card slot while data is being written in or read from the PC card such as a memory card or a like embedded in the PC card slot in the conventional information processing device having the PC card interface such as the notebook personal computer, thus causing data corruption in the PC card.
2. The information processing device such as the notebook personal computer stalls when the PC card is pulled out from the PC card slot before a software termination procedure for the PC card interface is completed if no measures against insertion and withdrawal of hot lines are installed in the conventional information processing device having the PC card interface, an OS (Operating System) or a driver.

SUMMARY OF THE INVENTION

In view of the above, it is an object of the present invention to provide a PC (Personal Computer) card slot and an information processing device using the PC card slot which are capable of having a user recognize a state of a PC card so that the user should not pull out the PC card carelessly or accidentally from the PC card slot during access to the PC card or before completion of software termination procedures.

According to a first aspect of the present invention, there is provided a PC card slot including:

a PC card interface; and a light emitting unit which goes on or off in response to a state of a PC card connected to the PC card interface.

In the foregoing, a preferable mode is one wherein the light emitting unit is an LED (Light Emitting Diode) or an electro-luminescence device or an electro-luminescence device.

According to a second aspect of the present invention, there is provided an information processing device including:

a PC card slot being equipped with a PC card interface and with a light emitting unit which goes on or off in response to a state of a PC card connected to the PC card interface.

In the foregoing, it is preferable that the light emitting unit is an LED.

Also, it is preferable that the information processing device is a portable personal computer.

With the above configurations in which the PC card interface and the light emitting unit connected to the PC card interface which goes on or off in response to the state of the PC card are provided, the following effects can be obtained:

(1) Data corruption in the PC card can be prevented. That is, since the user can recognize by illumination of the LED that the PC card is being used, careless and accidental pulling-out of the PC card from the PC card slot during access to the PC card or before completion of software termination procedures can be prevented.

(2) Stalling of the information processing device can be prevented. That is, since the user can recognize by the illumination of the LED that the PC card is now in operation, the stalling that would occur if the PC card is pulled out before the completion of the software termination procedures for the PC card in the information processing device in which measures against insertion and withdrawal of hot lines have not been installed.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Embodiment

Figure 1:
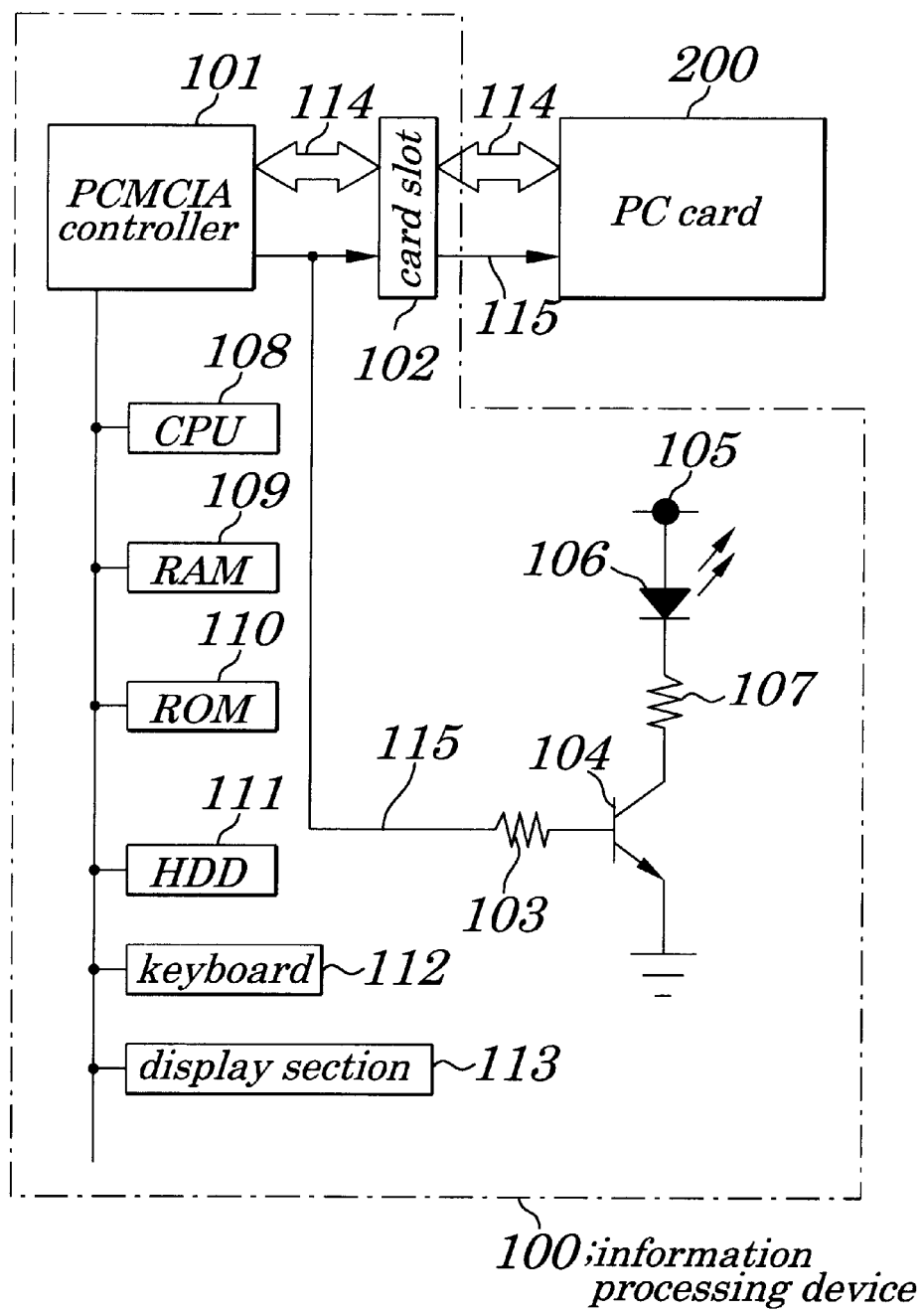
FIG. 1 is a schematic block diagram showing configurations of an information processing device using a PC card slot according to an embodiment of the present invention.

FIG. 1 is a schematic block diagram showing configurations of an information processing device using a PC card slot according to an embodiment of the present invention. It also shows one example of a PC card interface section in an internal circuit of the information processing device such as a notebook personal computer or a like. As shown in FIG. 1, an information processing device 100 includes a PCMCIA (Personal Computer Memory Card International Association) controller 101, a PC card slot 102, a resistor 103, a transistor 104, a power source 105, an LED (Light Emitting Diode) 106, a resistor 107, a CPU (Central Processing Unit) 108, a RAM (Random Access Memory) 109, a ROM (Read Only Memory) 110, an HDD (Hard Disk Driver) 111, a keyboard 112 and a display section 113.

A PC card 200 is inserted into the PC card slot 102, where a connector of the PC card 200 is connected to that of the PC card 200 so that an electrical connection between their signal lines is established. The PCMCIA controller 101 and the PC card slot 102 (including connectors or a like embedded therein) make up a PC card interface. In the information processing device 100, being, for example, the notebook personal computer, application programs stored in the HDD 111 are read to the RAM 109 by a user's operation of the keyboard 112 and are executed by the CPU 108. Results from the execution are displayed on the display section 113 made up of an LCD (Liquid Crystal Display) or a like. Moreover, in the ROM 110 are stored control programs including a BIOS (Basic Input/Output System) or a like.

Software including OS controls the PCMCIA controller 101 using the BIOS read from the ROM 110 and operations of the PC card 200 are controlled by the PCMCIA controller 101. At this point, the PCMCIA controller 101 exchanges a variety of signals 114 (including data signals and control signals) through the PC card slot 102 with the PC card 200.

On the other hand, the PC card slot 102 is controlled by the PCMCIA controller 101, that is, a PC card power control signal 115 being a control signal fed from the PCMCIA controller 101 is input not only to the PC card 200 but also to a transistor 104 through the resistor 103. The PC card power control signal 115 is used to control an ON/OFF of the transistor 104, thus causing an output voltage from the power source 105 to be applied to the LED 106. Moreover, instead of the LED 106, an other light emitting device such as an electro-luminescence device or a like may be employed.

Figure 2:
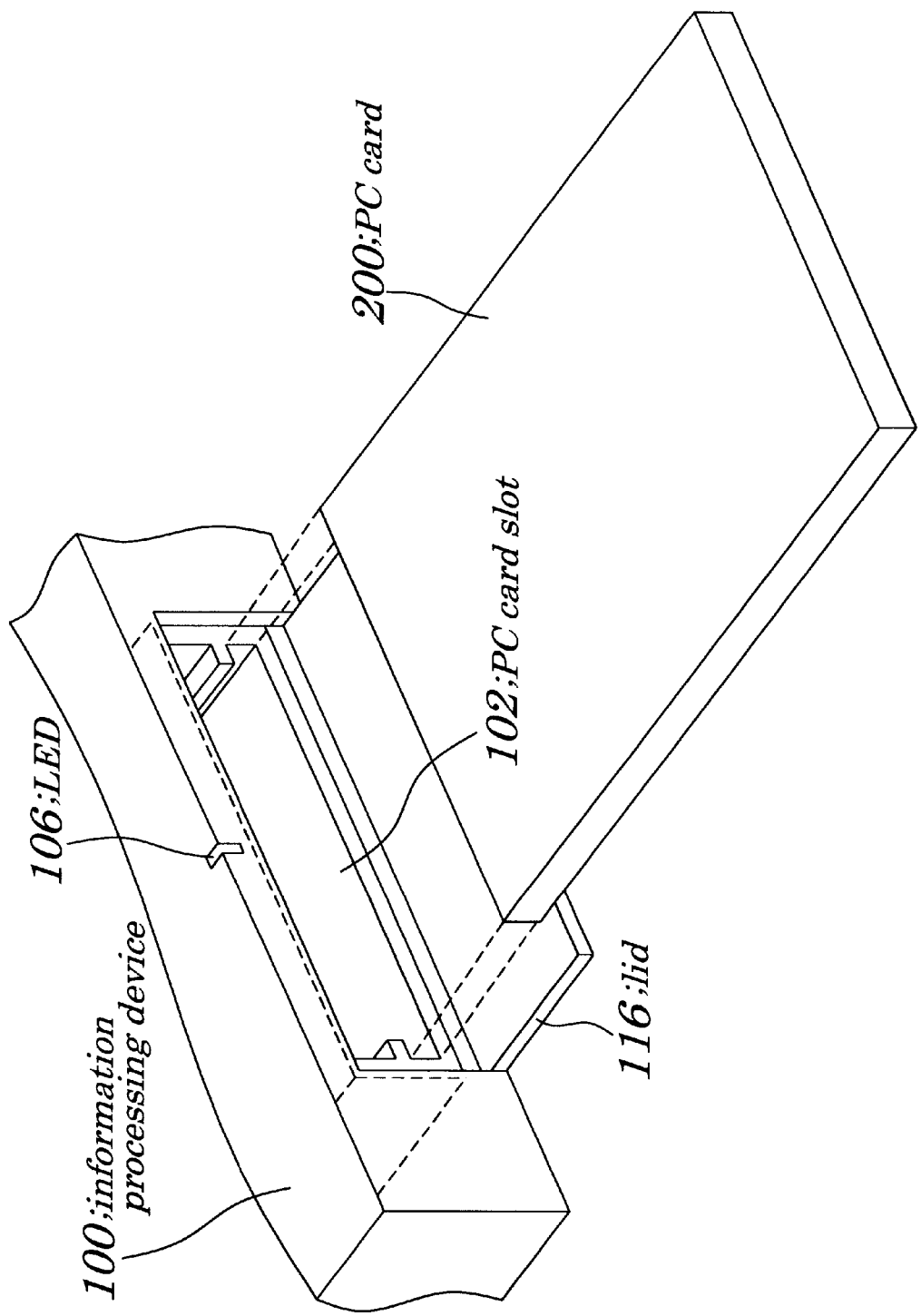
FIG. 2 is a perspective view showing an appearance of the PC card slot of FIG. 1.

FIG. 2 illustrates a part of an appearance of the information processing device 100 including the PC card slot 102 of the embodiment of the present invention. The PC card slot 102 is installed in a cabinet (not shown) of the information processing device 100 and at an upper part of the PC card slot 102 is mounted the LED 106. A lid 116 is used to block an opening of the PC card slot 102 after the PC card 200 is pulled out, which prevents an entry of dust. Moreover, a placement of the LED 106 is not limited to the case shown in FIG. 2, that is, it may be placed at any place, for example, at an upper part of the PC card slot 102 or in a vicinity of the PC card slot 102 (on the cabinet of the information processing device 100), so that the user can monitor easily operations at a time of detachment of the PC card 200.

Next, operations of circuits shown in FIG. 1 will be described below. Normally, when the PC card 200 is inserted into the PC card slot 102 of the information processing device 100, the PCMCIA controller 101 recognizes that the PC card 200 has been inserted and asserts the PC card power control signal 115. When the PC card power control signal 115 is asserted, power for the PC card 200 is supplied to the PC card slot 102 and, at the same time, the transistor 104 is turned ON, causing the LED 106 to go on. After that, when the execution of application programs being used is stopped, the PCMCIA controller 101 takes a predetermined software termination procedure and deasserts the PC card power control signal 115, causing the transistor 104 to be turned OFF and the LED 106 to go off.

In FIG. 2, when the user inserts the PC card 200 into the PC card slot 102 to use the PC card 200 while the information processing device is in operation, the LED 106 goes on. So long as the PC card 200 is being used, the LED 106 continues illuminating. When the use of the PC card 200 is terminated and software termination procedures are taken, the LED 106 goes off. If the LED 106 has gone off, even if the PC card 200 is pulled out, data corruption does not occur.

It is apparent that the present invention is not limited to the above embodiments but may be changed and modified without departing from the scope and spirit of the invention. For example, the circuit of the present invention may be applied, due to its small-sized configurations, to any information processing device having the PC card-slot and placing importance on portability such as small notebook personal computers, PDAs (Personal Digital Assistants) or a like. Moreover, the present invention can be used for not only PC cards constructed in accordance with the PCMCIA standards (including Type I, II and III) but also other cards and card slots having similar configurations.

What is claimed is:

1. An information processing device comprising:
a personal computer;
a personal computer card interface located in said personal computer, and made up of a personal computer card slot and a personal computer card adapter controller which is connected to said personal computer card slot and controlled by software including OS (Operating System) of said personal computer; and
a light emitting circuit comprising a bipolar transistor and a light emitting unit connected to said bipolar transistor, a base of which is connected to said personal computer card adapter controller, wherein said light emitting unit in said personal computer goes on when a computer card is inserted into said personal computer card slot and said personal computer card adapter controller generates and outputs a PC card power control signal to initiate a power supply for said personal computer card and to open said bipolar transistor, and goes off when use of said computer card is terminated and said personal computer card adapter controller takes a predetermined software termination procedure and stops said PC card power control signal, causing said bipolar transistor to be turned off.

2. The information processing device according to claim 1, wherein said light emitting unit is a light emitting diode.

3. The information processing device according to claim 1, wherein said personal computer is a portable personal computer.

4. The information processing device according to claim 1, wherein said light emitting unit is an electro-luminescence device.

5. An information processing device comprising:
a personal computer;
a personal computer card interface located in said personal computer, and made up of a personal computer card slot and a personal computer card adapter controller which is connected to said personal computer card slot and controlled by software including OS (Operating System) of said personal computer; and
a light emitting circuit connected between said personal computer card adapter controller and said personal computer card slot and comprising a bipolar transistor with resistors in base and collector, a power source and a light emitting unit located in said personal computer and wherein said bipolar transistor is connected to said light emitting unit and said personal computer card adapter controller, and wherein said light emitting unit goes on when a computer card is inserted into said personal computer card slot and said personal computer card adapter controller generates and outputs a PC card power control signal to initiate a power supply for said personal computer card and to open said transistor, and goes off when execution of application programs on said personal computer is stopped use of said computer card is terminated and said personal computer card adapter controller takes a predetermined software termination procedure and stops said PC card power control signal, causing said transistor to be turned off.

6. The information processing device according to claim 5, wherein said light emitting unit is a light emitting diode.

7. The information processing device according to claim 5, wherein said personal computer is a portable personal computer.

8. The information processing device according to claim 5, wherein said light emitting unit is an electro-luminescence device.

* * * * *